United States Patent
Saito et al.

(10) Patent No.: US 11,336,706 B1
(45) Date of Patent: May 17, 2022

(54) PROVIDING COGNITION OF MULTIPLE ONGOING MEETINGS IN AN ONLINE CONFERENCE SYSTEM

(71) Applicant: International Business Machines Corporation, Armonk, NY (US)

(72) Inventors: Akira Saito, Ichikawa (JP); Takeshi Watanabe, Kawasaki (JP); Hayato Uenohara, Funabashi (JP); Seiya Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/149,986

(22) Filed: Jan. 15, 2021

(51) Int. Cl.
*H04L 65/403* (2022.01)
*G06Q 10/10* (2012.01)

(52) U.S. Cl.
CPC ....... *H04L 65/403* (2013.01); *G06Q 10/1095* (2013.01)

(58) Field of Classification Search
CPC .......................... H04L 65/403; G06Q 10/1095
See application file for complete search history.

(56) References Cited

U.S. PATENT DOCUMENTS

| | | | | |
|---|---|---|---|---|
| 5,999,208 A | * | 12/1999 | McNerney | H04N 7/15 348/14.03 |
| 7,346,654 B1 | * | 3/2008 | Weiss | H04N 7/15 348/E7.083 |
| 2008/0147471 A1 | | 6/2008 | Singh | |
| 2009/0113314 A1 | * | 4/2009 | Dawson | G06F 3/011 715/757 |
| 2011/0153768 A1 | * | 6/2011 | Carter | G06Q 10/10 709/207 |
| 2011/0268263 A1 | * | 11/2011 | Jones | H04M 3/563 379/202.01 |
| 2011/0307550 A1 | * | 12/2011 | Bastide | H04L 12/1827 709/204 |
| 2012/0224021 A1 | * | 9/2012 | Begeja | H04N 7/155 348/14.08 |

(Continued)

FOREIGN PATENT DOCUMENTS

JP 2012108587 A 6/2012

OTHER PUBLICATIONS

Willard, A., and P. Platt. "The ramblers guide to virtual environments." IEE colloquium The 3D Interface for the Information Worker. vol. 19. 1998. (Year: 1998).*

(Continued)

*Primary Examiner* — Andrew T Chiusano
(74) *Attorney, Agent, or Firm* — VanLeeuwen & VanLeeuwen; Alexander G. Jochym

(57) ABSTRACT

An approach is provided in which the approach identifies a set of active online meetings in which the approach identifies a set of active online meetings in which a user is participating. The approach dynamically computes an interest level of each of the set of active online meetings based on a set of user preferences to produce a set of interest levels corresponding to the set of active online meetings. The approach determines a priority order of the set of active online meetings based on the set of interest levels and presents the set of active online meetings to the user based on the determined priority order.

14 Claims, 10 Drawing Sheets

(56) References Cited

U.S. PATENT DOCUMENTS

| | | | | |
|---|---|---|---|---|
| 2013/0239024 | A1* | 9/2013 | Lewis | H04N 7/15 |
| | | | | 715/756 |
| 2014/0123027 | A1* | 5/2014 | Kozloski | G06Q 10/1095 |
| | | | | 715/753 |
| 2018/0205797 | A1* | 7/2018 | Faulkner | H04L 65/403 |
| 2019/0305976 | A1* | 10/2019 | Bender | G10L 15/1807 |

OTHER PUBLICATIONS

Latiff, Muhammad Shafie Abd, and Rohayanti Hassan. "An Efficient Virtual Tour—A Merging of Path Planning and Optimization." Work with Computing Systems. 2004. (Year: 2004).*

"Joining multiple meetings simultaneously on desktop," Zoom Help Center, Sep. 4, 2020, 3 pages.

Anonymous, "Method and System of Optimizing Meeting Schedules using Cognitive Meeting Scheduler," IP.com, IPCOM000247240D, Aug. 17, 2016, 4 pages.

"SpatialChat," 2020, 1 page.

Anonymous, "Tool and application using cognitive learning to provide an optimized smarter meeting management," IP.com, IPCOM000260032D, Oct. 11, 2019, 3 pages.

"Humanize the Online Event Experience," Remo Conference, Remo, 2020.

\* cited by examiner

Point-in-Time Interest Level Table 400

| INTEREST SCORES | MEETING A | MEETING B | MEETING C | MEETING D |
|---|---|---|---|---|
| Topic Interest Score | 45 | 40 | 35 | 18 |
| Speaker Interest Score | 44 | 40 | 20 | 25 |
| Meeting Atmosphere Score | 10 | 8 | 9 | 10 |
| Invitation Score | 10 | 0 | 0 | 10 |
| Involvement Level Score | 10 | 3 | 6 | 2 |
| Total Interest Level Score | 119 | 91 | 70 | 65 |
| Priority Ranking | 1 | 2 | 3 | 4 |

410 — Topic Interest Score
420 — Speaker Interest Score
430 — Meeting Atmosphere Score
440 — Invitation Score
450 — Involvement Level Score
460 — Total Interest Level Score
470 — Priority Ranking

*FIG. 4*

PROVIDING COGNITION OF MULTIPLE ONGOING MEETINGS IN AN ONLINE CONFERENCE SYSTEM

BACKGROUND

The advancement of network technology and personal device technology has caused an exponential growth in video conferencing, also referred to as web conferencing. Web conferencing systems allow users to conduct live audio/video discussions for meetings, training events, lectures, presentations, or personal conversations using web-connected devices. Users conduct live web conferences using common devices having a microphone, a camera, and a display, such as a desktop computer, a laptop computer, a smart phone, and etcetera.

Web conferencing includes various types of online conferencing and collaborative services including webinars ("web seminars"), webcasts, and web meetings. In general, web conferencing is made possible by Internet technologies, particularly on TCP/IP connections and services that allow real-time point-to-point communications as well as multi-cast communications from one sender to many receivers.

BRIEF SUMMARY

According to one embodiment of the present disclosure, an approach is provided in which the approach identifies a set of active online meetings in which a user is participating. The approach dynamically computes an interest level of each of the set of active online meetings based on a set of user preferences to produce a set of interest levels corresponding to the set of active online meetings. The approach determines a priority order of the set of active online meetings based on the set of interest levels and presents the set of active online meetings to the user based on the determined priority order.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram depicting a table of interest level scores for various interest factors and relative priority rankings of multiple active online meetings;

DETAILED DESCRIPTION

Figure 1:
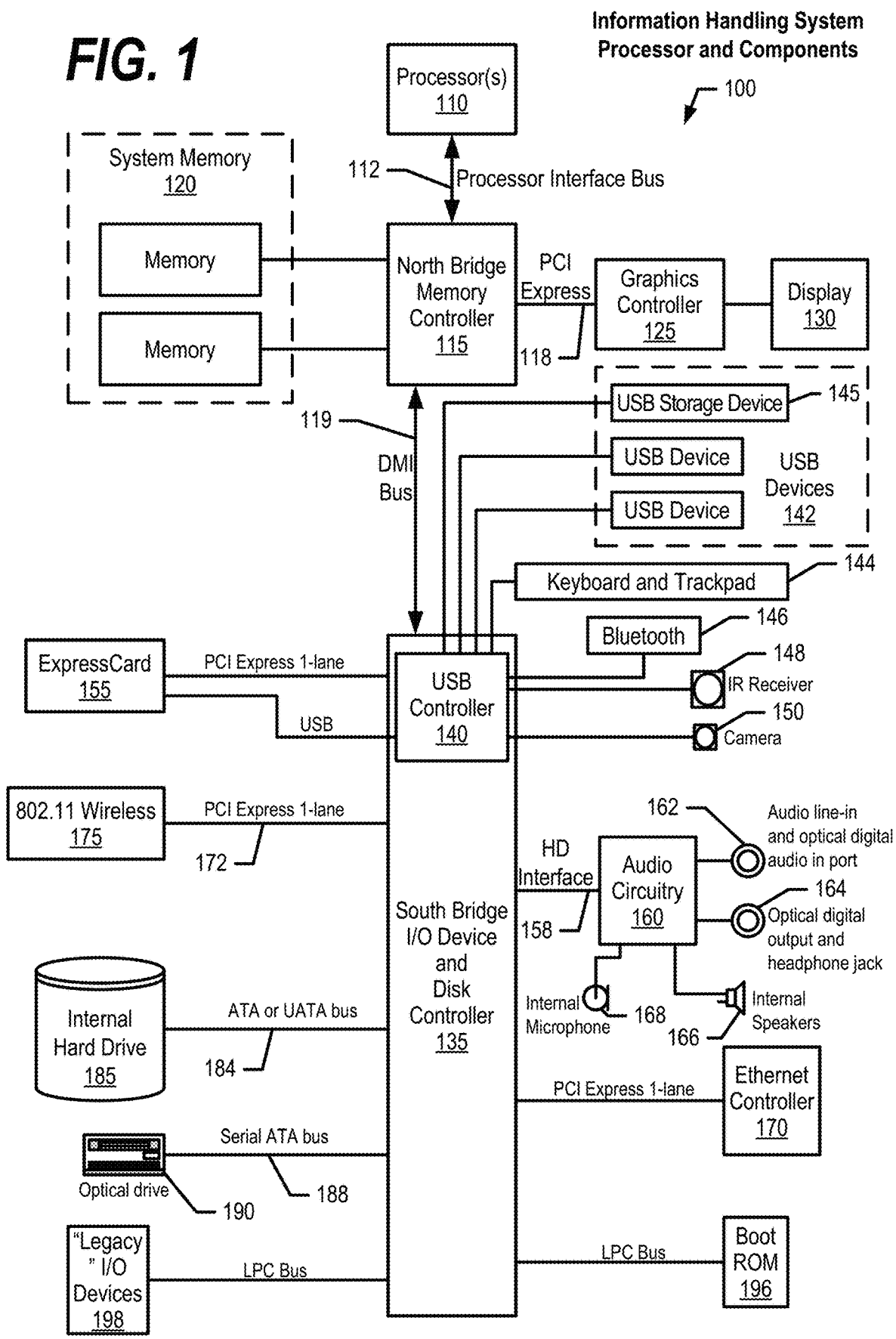
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
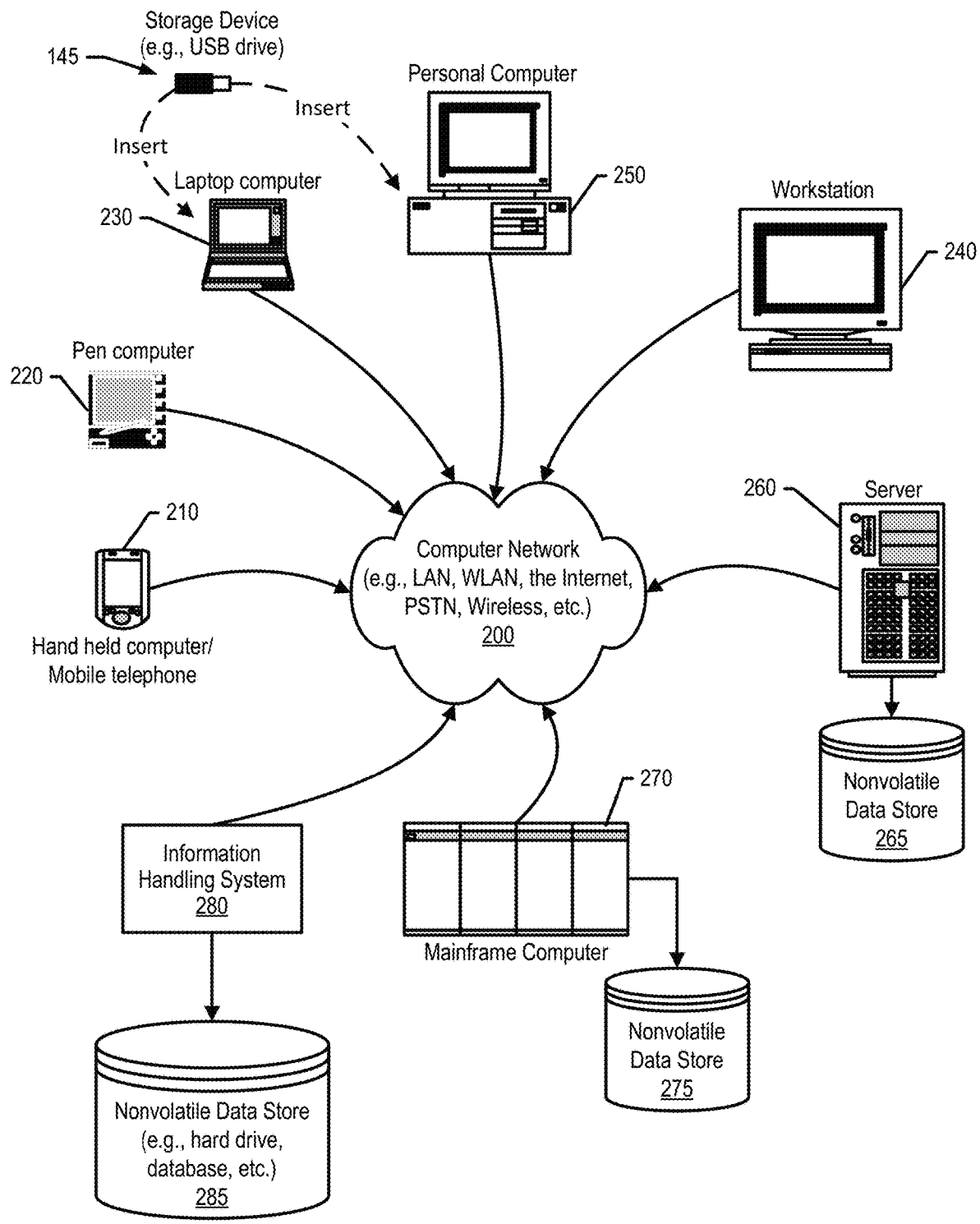
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, web conferencing is becoming a mainstream to conduct business meetings and casual conversations. A challenge found with online environments, however, is that although a user is able to participate in multiple online meetings, the user has difficulty tracking which one of the online meetings to provide attention as the meetings progress. In addition, in a real-world business setting, employees conduct both formal meetings (e.g., in conference rooms) and casual conversations (e.g., around a water cooler) with co-workers. A challenge found with online meeting environments is that it is difficult for a user to start a casual conversation or join a casual conversation when the user hears other co-workers discussing an interesting topic.

FIGS. 3 through 10 depict an approach that can be executed on an information handling system that constantly monitors discussion content and speakers of active online meetings and dynamically changes the presentation properties (e.g., sound volume, window size, participation mode, etc.) of each active online meeting in a user interface according to their computed interest level relative to the user's preferences. In addition, the approach monitors other active online meetings in which the user is not participating and recommends user participation when the active online meeting's computed interest level reaches a threshold.

In one embodiment, a user registers a set of user preferences that include topics and/or interesting speakers and the approach uses the set of user preferences to compute an interest level, also referred to herein as an interest level score, of each active online meeting. The approach then determines a relative priority of each of the active online meeting based on their corresponding interest level. The user participates in multiple online meetings concurrently and the approach manages the audio/video presentation of the online meetings via a user interface based on their corresponding priority. For example, the user interface displays a high priority meeting in a large window with increased volume and displays a low priority meeting in a small window with little/no audio or video (see FIG. 5 and corresponding text for further details). The approach dynamically computes interest levels as topics/speakers change during the active online meetings and adjusts priority levels accordingly (see FIG. 6 and corresponding text for further details).

Figure 3:
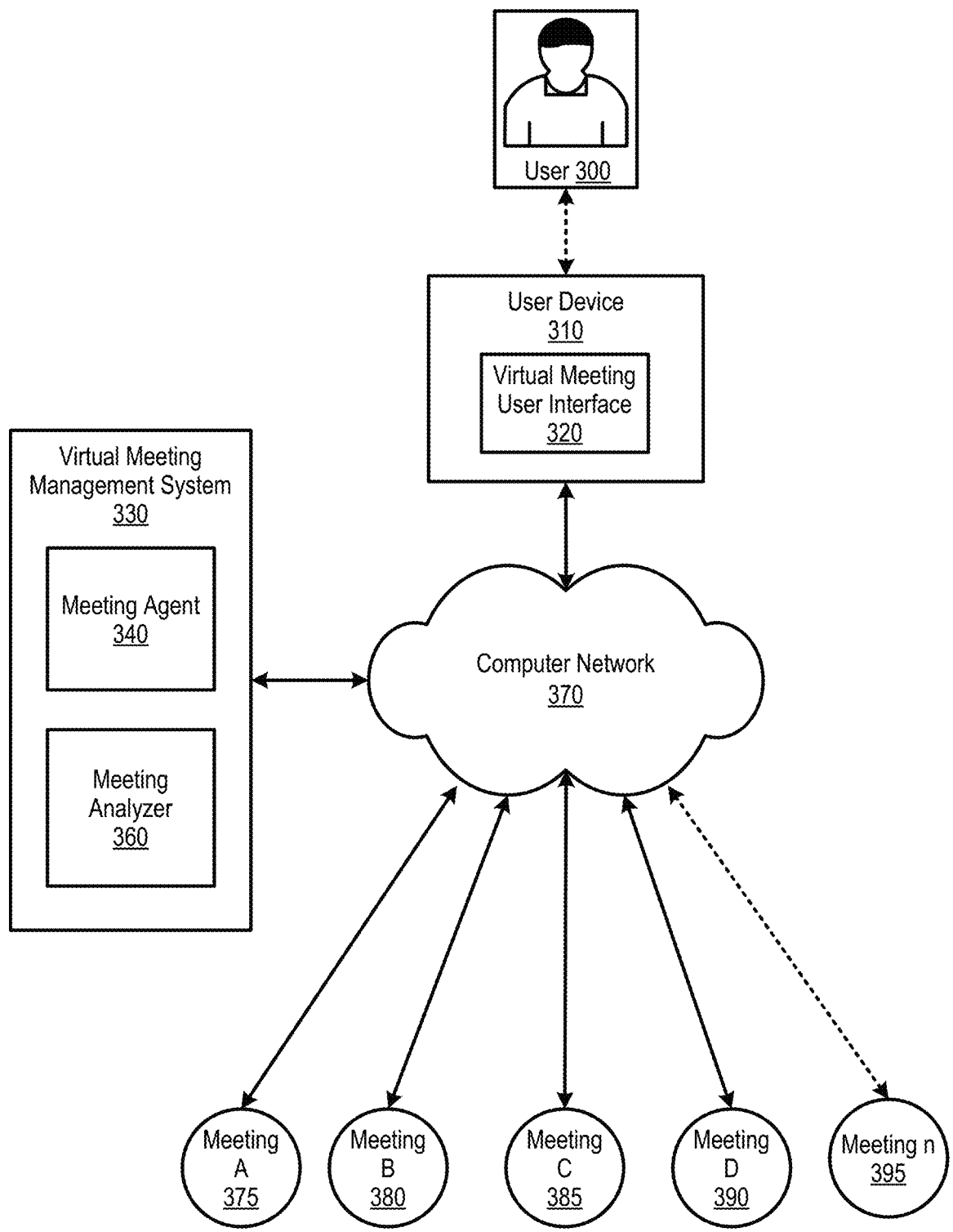
FIG. 3 is an exemplary diagram depicting a virtual meeting management system that determines a priority order of multiple active online meetings based on user preferences and interfaces with a virtual meeting user interface to display the multiple active online meetings to a user in a manner according to the determined priority order.

FIG. 3 is an exemplary diagram depicting virtual meeting management system 330 that determines a priority order of multiple active online meetings based on user preferences. Virtual meeting management system 330 interfaces over computer network 370 with virtual meeting user interface 320 installed on user device 310 to display the multiple active online meetings to user 300 in a manner according to the determined priority order (see FIG. 5 and corresponding text for further details).

Virtual meeting management system 330 analyzes meetings in which user 300 is participating (meeting A 375, meeting B 380, meeting C 385, and meeting D 390) and assigns a priority level to each meeting based on a set of user preferences. In turn, virtual meeting management system 330 interfaces with virtual meeting user interface 320 to present the meetings to user 300 based on their relative priority. In one embodiment, virtual meeting management system 330 actively monitors and computes interest levels for meetings in which user 300 is not participating (e.g., meeting n 395). When meeting n 395 produces an interest level that reaches a threshold, virtual meeting management system 330 sends a recommendation to user 300 to join the meeting.

Virtual meeting management system 330, in one embodiment, includes meeting agent 340 and meeting analyzer 360. Meeting analyzer 360 captures content of an active online meeting in real-time and creates a meeting summary of the captured content. Meeting analyzer 360 then analyzes the meeting summary and assigns a topic to the content in real-time. Meeting analyzer 360 also performs speaker recognition in real-time to identify users that are proactively speaking. In one embodiment, meeting analyzer 360 performs sentiment analysis in real-time to determine whether the atmosphere of the meeting is positive or negative. In another embodiment, meeting analyzer 360 creates a summary video clip using video abstraction technique, which virtual meeting management 330 provides to user 300 to inform user 300 of the online meeting topic.

Meeting agent 340 compares the meeting topic and active speakers against the user preferences to compute an interest level of the active online meeting. In one embodiment, meeting agent 340 adjusts the interest level based on the atmosphere of the meeting, user 300's involvement in the meeting, and/or whether user 300 is invited to participate in the meeting (see FIGS. 4, 9, and corresponding text for further details).

Figure 6:
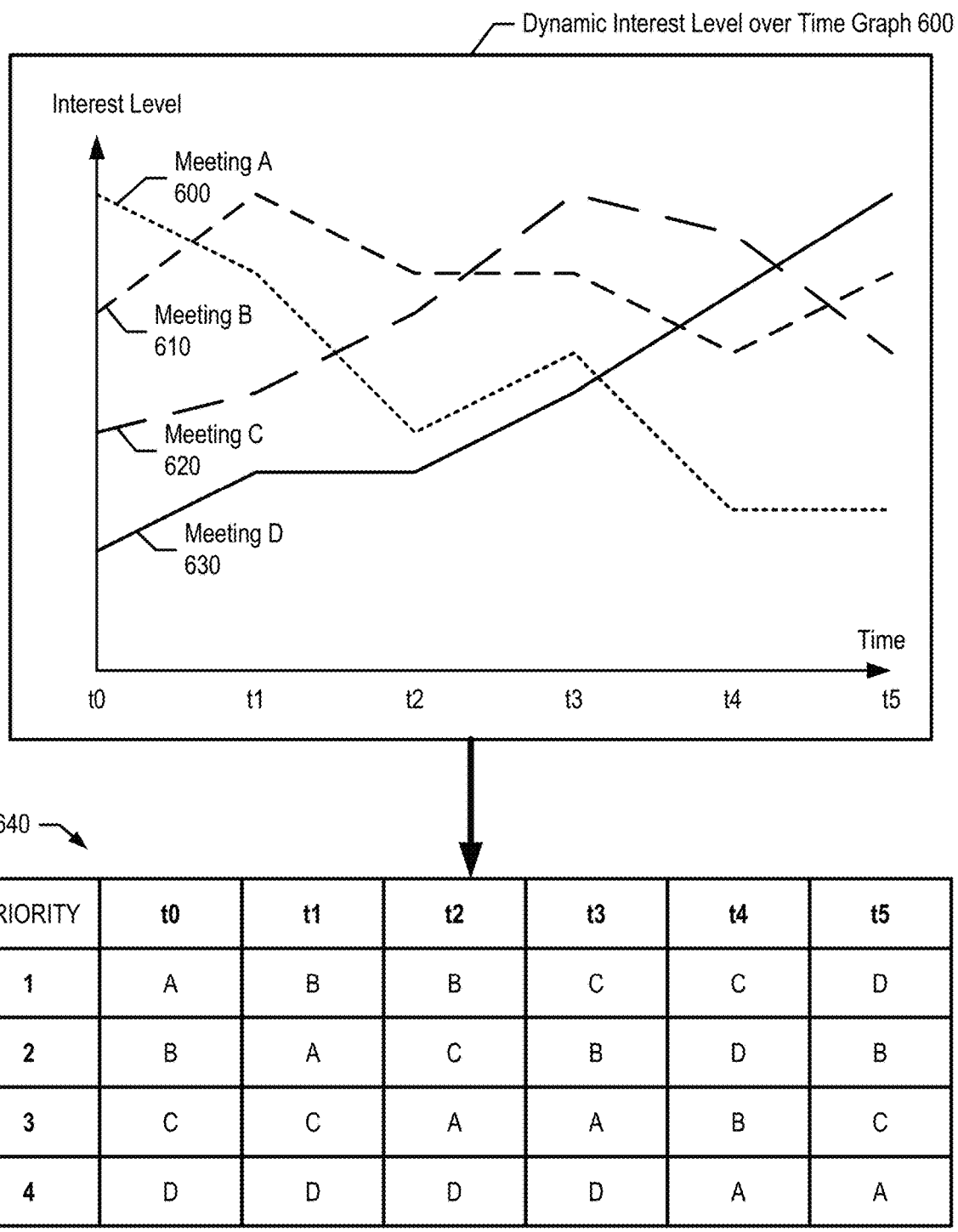
FIG. 6 is an exemplary diagram depicting dynamic interest level computations of a set of meetings while the set of meetings is ongoing.

As discussed herein, virtual meeting management system 330 dynamically computes the interest level of the meeting in real-time while the online meeting is active (see FIG. 6 and corresponding text for further details). In one embodiment, virtual meeting management system 330 assigns different "participation modes" in accordance with user 300's involvement. For example, when user 300 becomes a major participant and speaks frequently, virtual meeting management system 330 assigns a high degree of involvement. When user 300 speaks infrequently, virtual meeting management system 330 assigns an intermediate degree of involvement. And, when user 300 does not speak and completely acts as a listener, virtual meeting management system 330 assigns a low degree of involvement.

In one embodiment, virtual meeting management system 330 uses the participation mode assignments to adjust an active online meeting's interest level. In another embodiment, a participant in a meeting may be allowed to invite a person not participating in the meeting via virtual meeting management system 330. In this embodiment, when a person is invited from a participant of the meeting, the invited person may be prompted to participate in the meeting by increasing the invited person's interest level of the user to the meeting.

Figure 7:
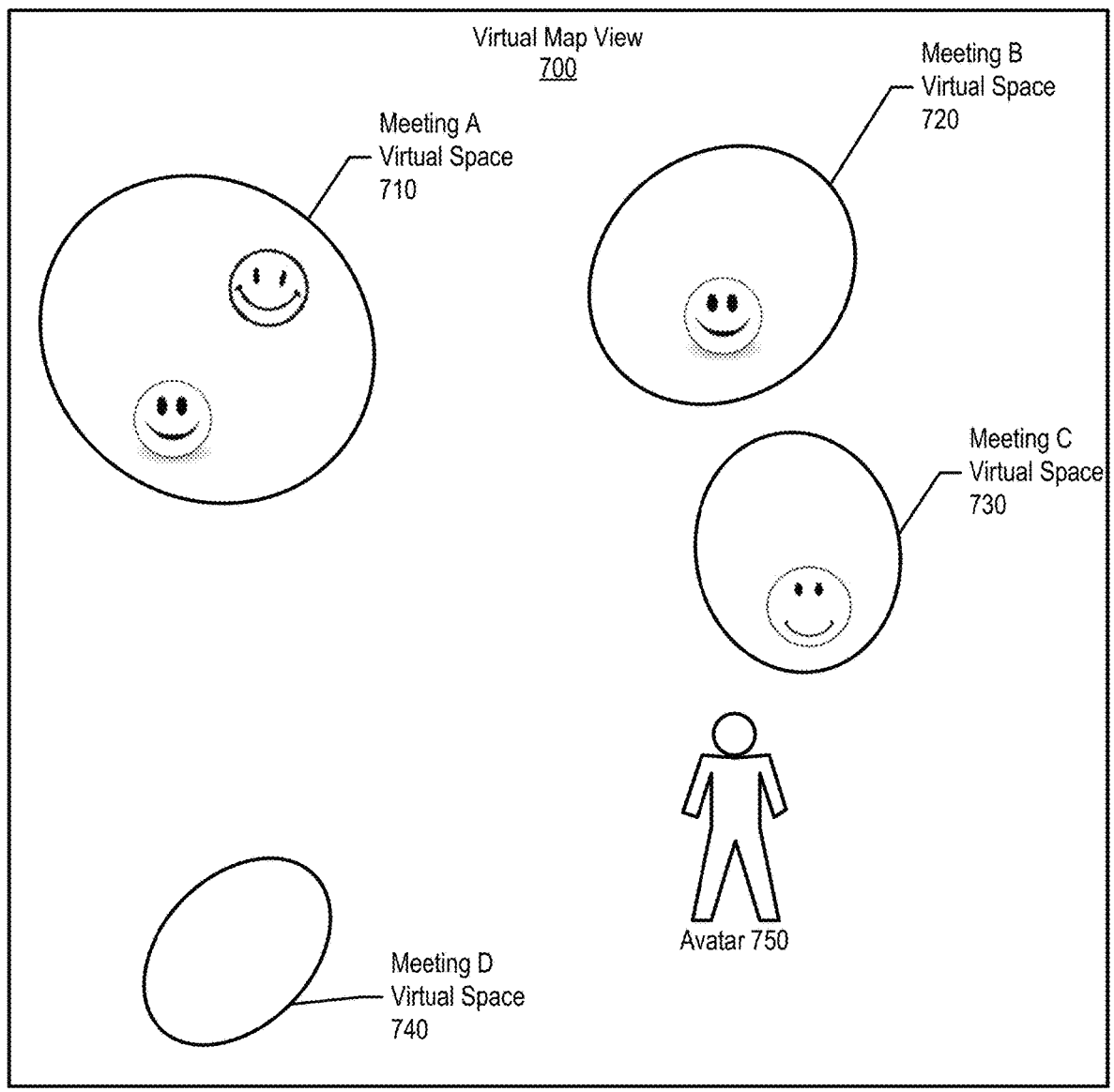
FIG. 7 is an exemplary diagram depicting a virtual map that allows a user to move in and out of active online meetings.

In one embodiment, virtual meeting management system 330 presents the active online meetings in virtual space (see FIG. 7 and corresponding text for further details). In this embodiment, virtual meeting management system 330 is configured to i) cause audio for each of the meetings in the virtual space to have directivity, which allows a user to easily "leave" its range when the user does not want to hear the sound; ii) enlarge the audible range of an online meeting for a user who is interested in the online meeting; and iii) provide recommendations to a user to participate in a meeting whose category is of interest to the user in such a manner that the user is drawn or pulled-in to the meeting. As a result, while participating in multiple online meetings, user 300 is able to be more involved in a meeting in which the user has a higher interest level.

FIG. 4 is an exemplary diagram depicting a table of interest level scores for various interest factors and relative priority rankings of multiple active online meetings. Point-in-time interest level table 400 includes five interest factors and their computations for various active online meetings at a specific point-in-time (rows 410 through 450), such as the beginning of each meeting that starts at the same time. Virtual meeting management system 330 may use more or less interest factors to determine relative priorities. In one embodiment, the interest factors may be weighted according to their relative importance.

As discussed herein, virtual meeting management system 330 computes the interest level scores for the active online meetings and computes an overall interest level (row 460). Then, virtual meeting management system 330 determines a relative priority of the active online meetings (row 470). FIG. 6 shows that the relative priorities change as the active online meetings progress and change topics/speakers.

Figure 5:
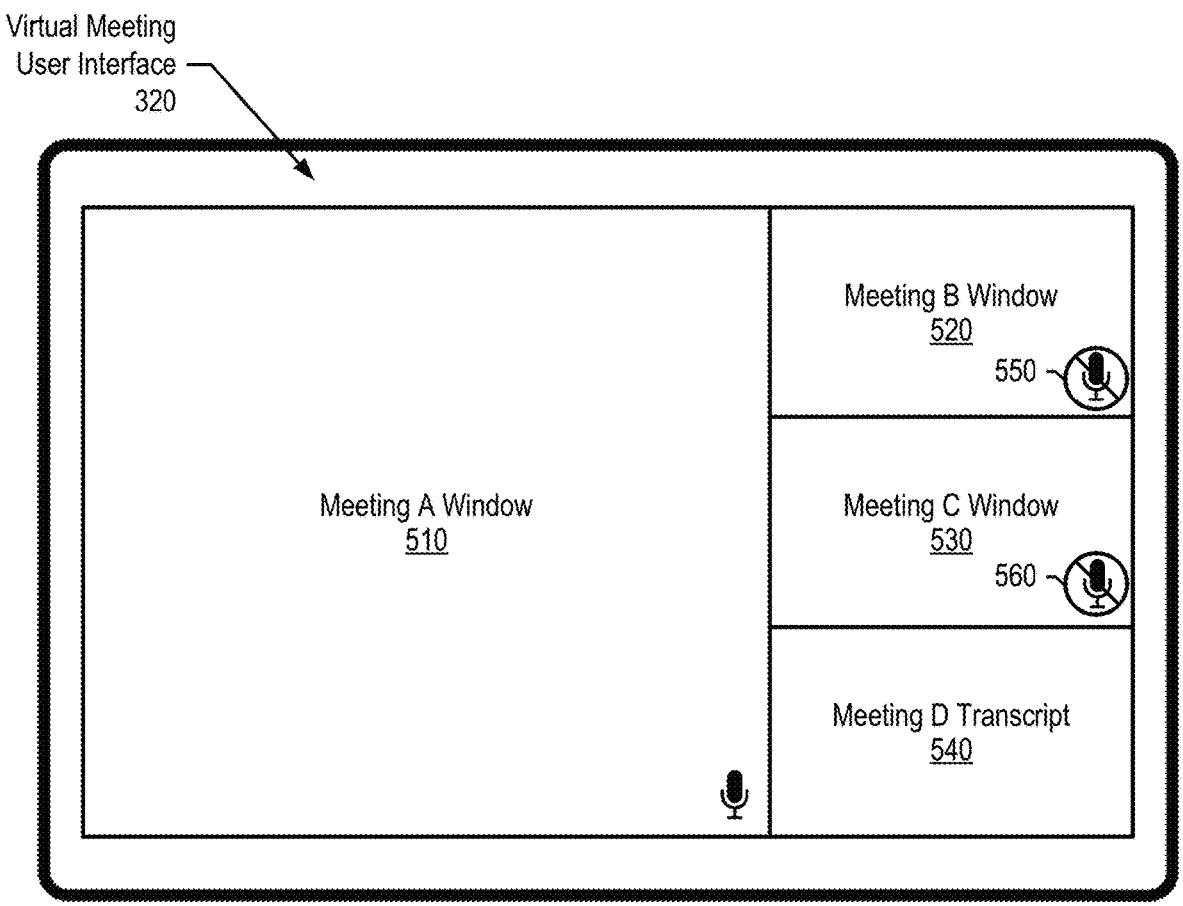
FIG. 5 is an exemplary diagram depicting a virtual meeting user interface that presents a set of meetings to a user based on presentation properties corresponding to their priority ranking.

FIG. 5 is an exemplary diagram depicting virtual meeting user interface 320 on user device 310 that presents a set of meetings based on display presentation properties corresponding to their priority ranking. Virtual meeting management system 330 works with virtual meeting user interface 320 to present a meeting in which a user has a high interest level to user 300 in an emphasized manner, such as using a large window size and/or increased audio volume. This allows user 300 to be more involved in the meeting (or casual conversation) which is of interest to user 300.

Virtual meeting management system 330 increases the audio volume in the meeting in which the user has a high interest level; displays the video of the meeting in which the user has a high interest level in a large format; and sets the participation mode of the user for a meeting in which the user has a high degree of involvement and interest to a higher level. Virtual meeting management system 330 dynamically changes which one of the online meetings to present with a loud sound and a large video as the topics/presenters of the meetings progress (see FIG. 6 and corresponding text for further details).

FIG. 5 shows that meeting A window 510 is displayed in a large window and indicates that user 300 is most interested in meeting A 375. Meeting B window 520 and meeting C window 530 are smaller windows for meeting B 380 and meeting C 385, respectively. Meeting D 390, in which the user has the lowest interest level, is displayed in meeting D window 540 and includes a transcript of the meeting. As such, when user 300 speaks without performing a specific operation, user 300 will be speaking in meeting A 375. When user 300 speaks while pressing mic icons 550 or 560 in meeting B window 520 or meeting C window 530, user 300 will be speaking in its respective meeting B 380 or meeting C 385.

User 300 participates in meeting D 390 in a listen-only manner. In one embodiment, user 300 may utilize a "manual override" mode where user 300 decides to temporary proactively participate in any of the meetings despite priority. For example, user 300 may manually select other actions not displayed via a context menu (e.g., enlarging meeting B window 520, turning video/audio/mic-on in meeting D transcript 540, etc.).

FIG. 6 is an exemplary diagram depicting dynamic interest level score computations while a set of meetings is ongoing and dynamic changes to their relative priority level. As meeting topics (or casual conversation topics) vary as active online meetings progress, virtual meeting management system 330 dynamically computes interest level scores of the meetings based on their point-in-time topics and adjusts their priority level accordingly. As such, virtual meeting user interface 320 dynamically adjusts the presentation of the virtual meetings to allow user 300 more involvement into meetings with high interest levels.

Dynamic interest level over time graph 600 shows meeting A line 600, meeting B line 610, meeting C line 620, and meeting D line 630, each corresponding to the interest level of respective meeting A 375, meeting B 380, meeting C 385, and meeting D 390. Table 640 shows that meeting A 375 is top priority at time t0, but falls to 4th priority at time t5. Table 640 also shows that meeting D starts at 4th priority at time t0 but raises to first priority at time t5. As such, virtual meeting management system 330 instructs virtual meeting user interface 320 to dynamically vary the presentation (audio/video/participation mode) of the meetings based on their dynamically changing relative priority.

FIG. 7 is an exemplary diagram depicting virtual map view 700 corresponding to a virtual space that allows user 300 to "move" in and out of active online meetings. In one embodiment, virtual meeting management system 330 guides avatar 750 in virtual map view 700 towards meetings with high interest levels to hear various conversations in the corresponding active online meetings. Meeting A virtual space 710 corresponds to meeting A 375 with two participants in which the user is interested. Meeting B virtual space 720 corresponds to meeting B 380 with one participant in which the user is interested. Meeting C virtual space 730 corresponds to meeting C 385 with one participant in which the user is interested. And, meeting D virtual space 740 corresponds to meeting D 390.

In one embodiment, virtual meeting management system 330 causes sounds (e.g., meeting audio) in the virtual space to have directivity, which allows user 300 to easily leave its range when user 300 does not want to hear the sound. Virtual meeting management system 330 also enlarges the audible range of an online meeting that has a high interest level. In another embodiment, the audio directivity and range is visually presented in virtual map view 700.

In one embodiment, when virtual meeting management system 330 detects a meeting in which a user is not participating but in which the user has a high interest level, virtual meeting management system 330 guides avatar 750 to participate in that meeting by notifying the direction of that meeting in the virtual space to user 300 and/or by drawing avatar 750 to that direction.

In another embodiment, when virtual meeting management system 330 analyzes active online meetings corresponding to multiple "booths," such as online exhibitions or online job fairs, virtual meeting management system 330 may present a "flow line" on virtual map view 700 to visit the booths having the highest interest level. In this embodiment, virtual meeting management system 330 accounts for the schedules of the sessions of the booths in such a way that a booth in the middle of excitement is prioritized over a booth reaching an end.

Figure 8:
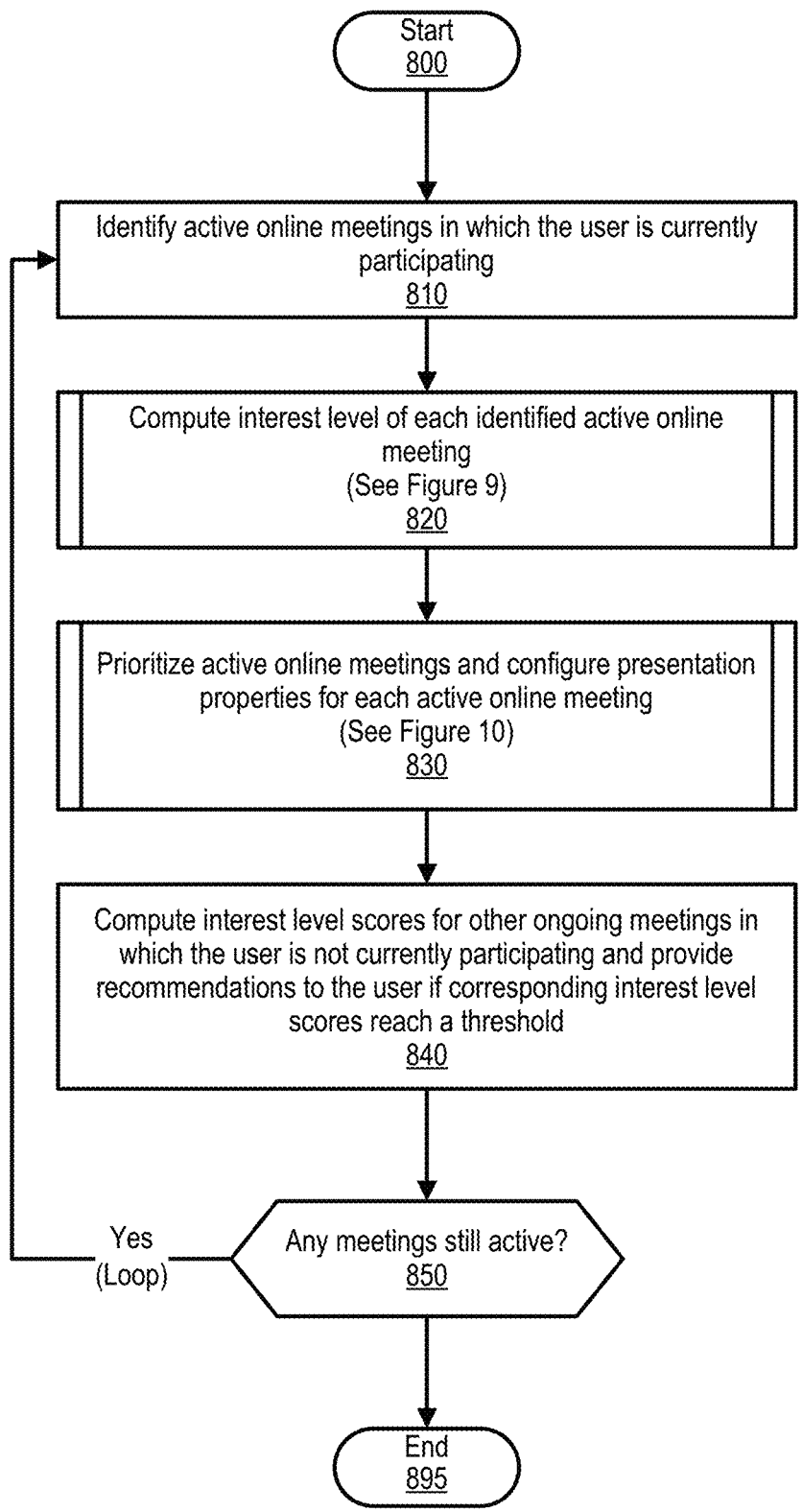
FIG. 8 is a high level flowchart showing steps taken to dynamically identify interest levels of active online meetings and present the active online meetings to a user in a manner based on prioritized interest levels.

FIG. 8 is a high level flowchart showing steps taken to dynamically identify interest levels of active online meetings and present the active online meetings in a manner based on prioritized interest levels. FIG. 8 processing commences at 800 whereupon, at step 810, the process identifies active online meetings in which the user is currently participating. For example, the user may be "logged on" to four separate active online meetings.

At predefined process 820, the process captures content from each of the active online meetings at a point-in-time and computes interest levels of each of the online meetings based on a set of user preferences such as meeting topics, active speakers, meeting atmosphere, user involvement level, etc. (see FIG. 9 and corresponding text for processing details).

At predefined process 830, the process prioritizes the active online meetings and configures the presentation properties of the active online meetings based on their corresponding priority order such as window sizes, audio volume levels, active/inactive microphone settings, etc. (see FIG. 10 and corresponding text for processing details).

At step 840, the process computes interest level scores for other ongoing meetings in which the user is not currently participating and provides recommendations to the user if corresponding interest level scores reach a threshold. In one embodiment, interest factor weightings (based on relative importance) are applied to their corresponding interest levels when determining whether the interest levels reach a threshold.

In one embodiment, the process searches for active online meetings using keyword searches based on user 300's meeting topic and speaker preferences. Then, the process captures content from matched active online meetings and performs steps shown in FIG. 9 to compute a total interest level score. In this embodiment, the process then compares the total interest level score against a threshold (or scores of currently participating meetings) and sends a recommendation to user 300 to join the meeting accordingly. In one embodiment, the process provides a summary video of the meeting to the user for the user to view.

The process determines as to whether there are any meetings that are still active (decision 850). If there are any meetings that are still active, then decision 850 branches to the 'yes' branch which loops back to capture more content from the active online meetings at a next point-in-time and generate a new set of interest level scores. This looping continues until there are no more active online meetings, at which point decision 850 branches to the 'no' branch exiting the loop. FIG. 8 processing thereafter ends at 895.

Figure 9:
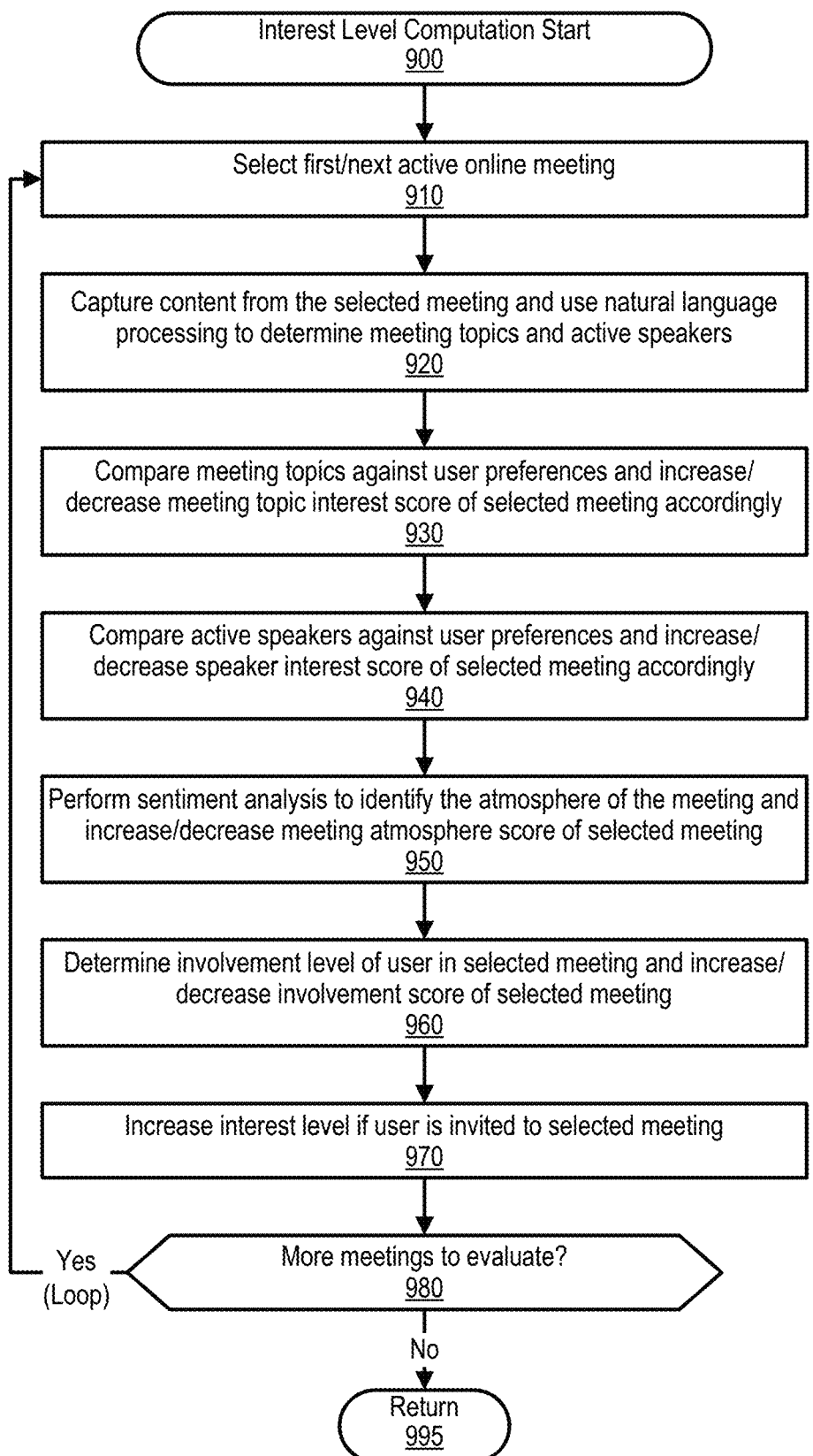
FIG. 9 is an exemplary flowchart showing steps taken to compute point-in-time (e.g. real time) interest level scores of active online meetings.

FIG. 9 is an exemplary flowchart showing steps taken to dynamically compute point-in-time interest level scores of active online meetings. FIG. 9 processing commences at 900 whereupon, at step 910, the process selects the first active online meeting. At step 920, the process captures content from the selected meeting (e.g., two minute snippet, metadata, agenda information, etc.) and uses natural language processing and/or voice recognition to determine meeting topics and active speakers at the point-in-time that the content is captured.

At step 930, the process compares the determined meeting topics against user preferences and increases/decreases a meeting topic interest score of the selected meeting accordingly. For example, the process may use a 50 point scoring system that is based on the relevancy of the determined meeting topics compared against the user's topic interests using techniques such as keyword matching or other comparison techniques.

At step 940, the process compares the determined active speakers against user preferences and increases/decreases a speaker interest score of the selected meeting accordingly. For example, similar to the meeting topic interest computations, the process may use a 50 point scoring system that is based on the determined speakers compared against the user's preferred speakers.

At step 950, the process performs sentiment analysis on the captured content to identify the atmosphere of the meeting and increases/decreases a meeting atmosphere score of the selected meeting, such as on a ten point scale. At step 960, the process determines involvement level of user in selected meeting and increase/decrease involvement score of selected meeting. For example, when user 300 becomes a major participant and speaks frequently, the process assigns a high involvement score to the meeting. When user 300 speaks infrequently, the process assigns an intermediate involvement score to the meeting. And, when user 300 does not speak and completely acts as a listener, the process assigns a low involvement score to the meeting. In another example, the process adjusts the involvement score based on the amount of times that user 300 hovers a mouse pointer over the corresponding active online meeting window.

At step 970, the process increases/decreases the interest level score of the meeting if user 300 is invited to the selected meeting. The process determines as to whether there are more meetings to evaluate (decision 980). If there are more meetings to evaluate, then decision 980 branches to the 'yes' branch which loops back to select and process another active online meeting. This looping continues until there are no more active online meetings to evaluate, at which point decision 980 branches to the 'no' branch exiting the loop. FIG. 9 processing thereafter returns to the calling routine (see FIG. 8) at 995.

Figure 10:
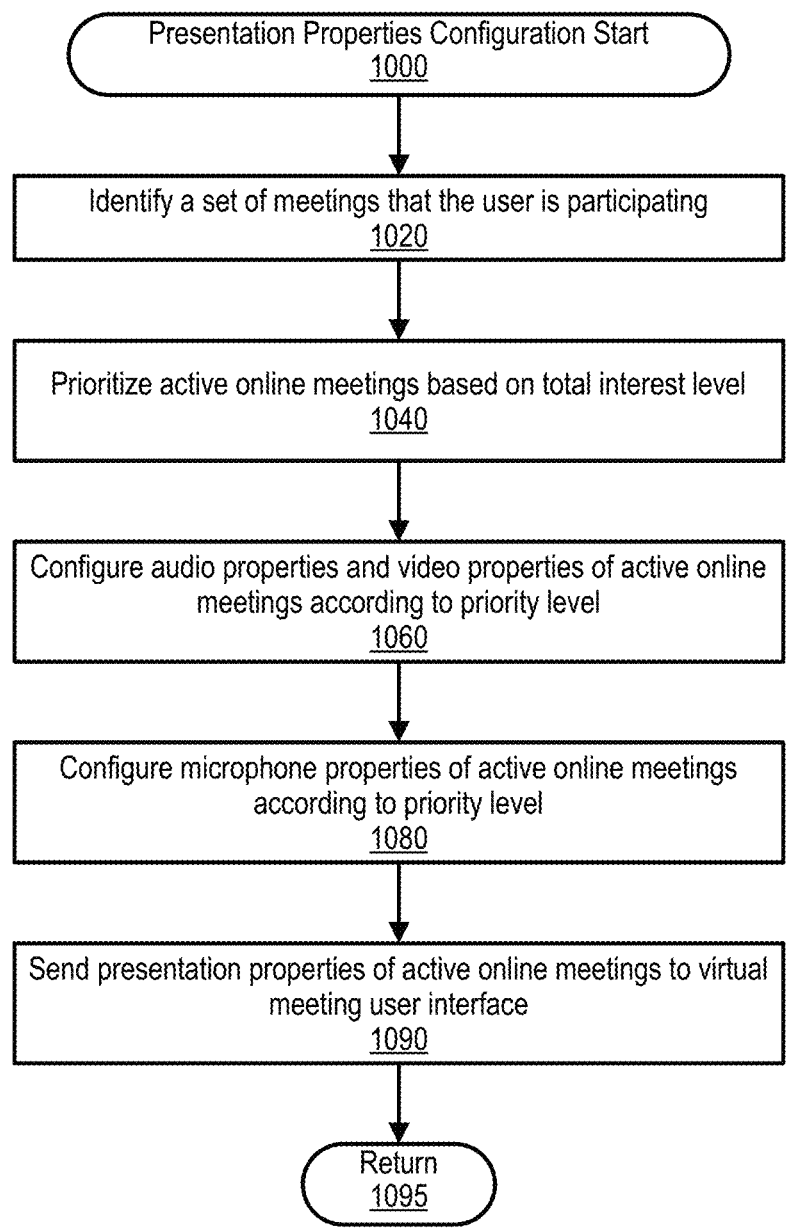
FIG. 10 is an exemplary flowchart showing steps taken to configure presentation properties of various active online meetings.

FIG. 10 is an exemplary flowchart showing steps taken to configure presentation properties of various active online meetings. FIG. 10 processing commences at 1000 whereupon, at step 1020, the process identifies a set of meetings that the user is participating. At step 1040, the process prioritizes the active online meetings based on total interest level.

At step 1060, the process configures audio properties and video properties of the active online meetings according to priority level. As discussed herein, the process configures a high priority meeting to be displayed in a large window with increased volume, and configures a low priority meeting to be displayed in a small window with little/no audio (see FIG. 5 and corresponding text for further details). In one embodiment, the process selects the top four prioritized active online meetings to configure and displays the top four prioritized active online meetings on virtual meeting user interface 320.

At step 1080, the process configures microphone properties of the active online meetings according to priority level. For example, the process may configure the highest priority active online meeting as having an active microphone and configure the remaining active online meetings as having a muted microphone. At step 1090, the process sends the presentation properties of the active online meetings to virtual meeting user interface 320 for virtual meeting user interface 320 to properly display the virtual meetings on user device 310. FIG. 10 processing thereafter returns to the calling routine (see FIG. 8) at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   identifying a plurality of active online meetings corresponding to a user;
   capturing a set of content from each of the plurality of active online meetings;
   dynamically computing an interest level of each of the plurality of active online meetings based on a set of user preferences of the user and the captured set of content, wherein the computing generates a plurality of interest level scores corresponding to the plurality of active online meetings and, for each one of the plurality of active online meetings, the computing further comprises:
computing a plurality of interest factor scores, wherein at least one of the plurality of interest factor scores is a meeting atmosphere score that is computed based on sentiment analysis of the captured set of content;
presenting the plurality of active online meetings to the user in a virtual meeting space;
determining a priority order of the plurality of active online meetings based on the plurality of interest level scores;
displaying a flow line in the virtual meeting space that indicates a visitation order to attend the plurality of active online meetings based on the determined priority order;
capturing a set of content from a different active online meeting in which the user is currently not participating;
computing a different interest level score of the different active online meeting based on comparing the set of content against the set of user preferences; and
in response to determining that the different interest level score reaches a threshold:
creating a summary video utilizing the captured set of content; and
sending a recommendation comprising the summary video to the user to join the different active online meeting.

2. The method of claim 1 further comprising:
selecting one of the plurality of active online meetings at a first point-in-time while the selected active online meeting is ongoing;
identifying a current discussion topic at the first point-in-time of the selected active online meeting; and
computing the interest level score of the selected online meeting based on comparing the current discussion topic against the set of user preferences.

3. The method of claim 2 further comprising:
identifying one or more participants of the selected active online meeting at the first point-in-time; and
computing the interest level score of the selected online meeting based on comparing the current discussion topic and the identified one or more participants against the set of user preferences.

4. The method of claim 1 further comprising:
determining, based on the priority order, a set of presentation properties of each of the plurality of active online meetings, wherein the set of presentation properties, for each of the plurality of active online meetings, comprises a window size and an audio level; and
presenting the plurality of meetings based on their corresponding set of presentation properties.

5. The method of claim 1 further comprising:
selecting at least one of the plurality of active online meetings; and
setting a participation mode of the selected active online meeting based on its corresponding determined priority order.

6. The method of claim 1 wherein the plurality of active online meetings are presented concurrently to the user on a single user interface.

7. An information handling system comprising:
one or more processors;
a memory coupled to at least one of the processors;
a set of computer program instructions stored in the memory and executed by at least one of the processors in order to perform actions of:
identifying a plurality of active online meetings corresponding to a user;
capturing a set of content from each of the plurality of active online meetings;
dynamically computing an interest level of each of the plurality of active online meetings based on a set of user preferences of the user and the captured set of content, wherein the computing generates a plurality of interest level scores corresponding to the plurality of active online meetings and, for each one of the plurality of active online meetings, the computing further comprises:
computing a plurality of interest factor scores, wherein at least one of the plurality of interest factor scores is a meeting atmosphere score that is computed based on sentiment analysis of the captured set of content;
presenting the plurality of active online meetings to the user in a virtual meeting space;
determining a priority order of the plurality of active online meetings based on the plurality of interest level scores;
displaying a flow line in the virtual meeting space that indicates a visitation order to attend the plurality of active online meetings based on the determined priority order;
capturing a set of content from a different active online meeting in which the user is currently not participating;
computing a different interest level score of the different active online meeting based on comparing the set of content against the set of user preferences; and
in response to determining that the different interest level score reaches a threshold:
creating a summary video utilizing the captured set of content; and
sending a recommendation comprising the summary video to the user to join the different active online meeting.

8. The information handling system of claim 7 wherein the processors perform additional actions comprising:
selecting one of the plurality of active online meetings at a first point-in-time while the selected active online meeting is ongoing;
identifying a current discussion topic at the first point-in-time of the selected active online meeting; and
computing the interest level score of the selected online meeting based on comparing the current discussion topic against the set of user preferences.

9. The information handling system of claim 8 wherein the processors perform additional actions comprising:
identifying one or more participants of the selected active online meeting at the first point-in-time; and
computing the interest level score of the selected online meeting based on comparing the current discussion topic and the identified one or more participants against the set of user preferences.

10. The information handling system of claim 7 wherein the processors perform additional actions comprising:
determining, based on the priority order, a set of presentation properties of each of the plurality of active online meetings, wherein the set of presentation properties, for each of the plurality of active online meetings, comprises a window size and an audio level; and presenting the plurality of meetings based on their corresponding set of presentation properties.

11. A computer program product stored in a computer readable storage medium, comprising computer program code that, when executed by an information handling system, causes the information handling system to perform actions comprising:

identifying a plurality of active online meetings corresponding to a user;

capturing a set of content from each of the plurality of active online meetings;

dynamically computing an interest level of each of the plurality of active online meetings based on a set of user preferences of the user and the captured set of content, wherein the computing generates a plurality of interest level scores corresponding to the plurality of active online meetings and, for each one of the plurality of active online meetings, the computing further comprises:

computing a plurality of interest factor scores, wherein at least one of the plurality of interest factor scores is a meeting atmosphere score that is computed based on sentiment analysis of the captured set of content;

presenting the plurality of active online meetings to the user in a virtual meeting space;

determining a priority order of the plurality of active online meetings based on the plurality of interest level scores;

displaying a flow line in the virtual meeting space that indicates a visitation order to attend the plurality of active online meetings based on the determined priority order;

capturing a set of content from a different active online meeting in which the user is currently not participating;

computing a different interest level score of the different active online meeting based on comparing the set of content against the set of user preferences; and in response to determining that the different interest level score reaches a threshold:

creating a summary video utilizing the captured set of content; and sending a recommendation comprising the summary video to the user to join the different active online meeting.

12. The computer program product of claim 11 wherein the information handling system performs further actions comprising:

selecting one of the plurality of active online meetings at a first point-in-time while the selected active online meeting is ongoing;

identifying a current discussion topic at the first point-in-time of the selected active online meeting; and computing the interest level score of the selected online meeting based on comparing the current discussion topic against the set of user preferences.

13. The computer program product of claim 12 wherein the information handling system performs further actions comprising:

identifying one or more participants of the selected active online meeting at the first point-in-time; and computing the interest level score of the selected online meeting based on comparing the current discussion topic and the identified one or more participants against the set of user preferences.

14. The computer program product of claim 11 wherein the information handling system performs further actions comprising:

determining, based on the priority order, a set of presentation properties of each of the plurality of active online meetings, wherein the set of presentation properties, for each of the plurality of active online meetings, comprises a window size and an audio level; and presenting the plurality of meetings based on their corresponding set of presentation properties.

\* \* \* \* \*